United States Patent [19]
Witzel

[11] 3,785,422
[45] Jan. 15, 1974

[54] CONNECTING LINK FOR ANTISKID CHAINS FOR TIRES

[75] Inventor: Günter Witzel, Aalen, Germany

[73] Assignee: Eisen- und Drahtwerk Erlau Aktiengesellschaft, Aalen, Germany

[22] Filed: Nov. 26, 1971

[21] Appl. No.: 202,391

[52] U.S. Cl. .............................................. 152/241
[51] Int. Cl. .......................................... B60c 27/06
[58] Field of Search .................... 152/231, 239, 241, 152/242, 243, 244, 245

[56] References Cited
UNITED STATES PATENTS
3,595,292  7/1971  Muller .............................. 152/243
3,614,971  10/1971  Muller .............................. 152/243

Primary Examiner—James B. Marbert
Attorney—Walter Becker

[57] ABSTRACT

A connecting link for antiskid chains for tires with a link body located in one plane, which link body is provided with a longitudinal opening and two sections spaced from each other so as to define a passage communicating with the longitudinal opening and leading to the outside of the link body while a closure member is detachably mounted in the passage, positively engages the walls defining the passage and divides the longitudinal opening into two substantially equal smaller openings.

18 Claims, 6 Drawing Figures

PATENTED JAN 15 1974 3,785,422

CONNECTING LINK FOR ANTISKID CHAINS FOR TIRES

The present invention relates to a connecting link for antiskid chains for tires, which is provided with a link body located in one plane with the annular parts thereof forming a receiving opening for the chain links to be inserted.

Heretofore known connecting links of the type involved are rather complicated as to their structure and can be assembled only in an awkward manner. Moreover they have a relatively great length as a result of which their use in a chain connection is limited.

It is, therefore, an object of the present invention so to design a connecting link of the above mentioned general type that the link will have a simple construction, can be easily installed and will be relatively short.

This object and other objects and advantages of the invention will appear more clearly from the following specification in connnection with the accompanying drawing, in which.

Figure 1:
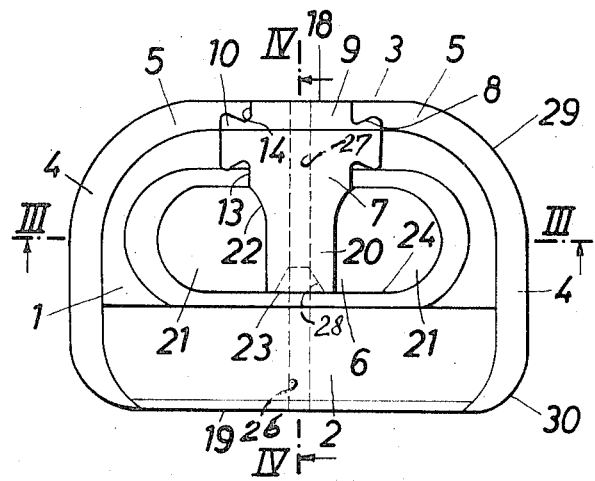
FIG. 1 is a view of a connecting link according to the invention.
Figure 4:
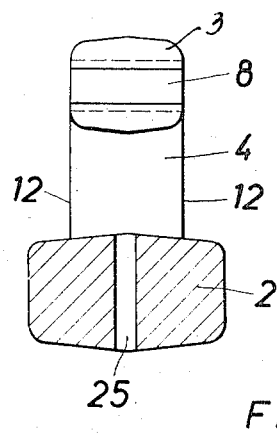
FIG. 4 is a section taken along the line IV — IV of FIG. 1, however, with the closure member omitted.
Figure 5:
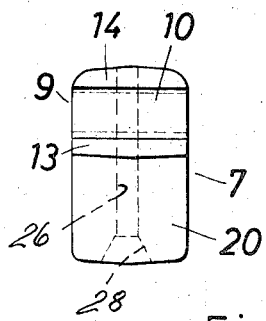
FIG. 5 shows the closure member of FIG. 1 as seen from the right-hand side with regard to the drawing.
Figure 2:
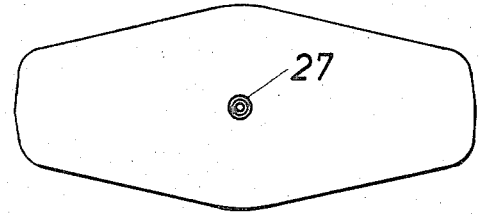
FIG. 2 shows a bottom view of the connecting link of FIG. 1.
Figure 6:
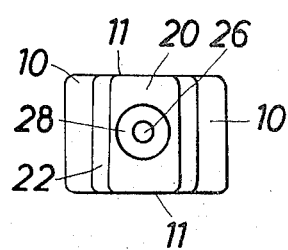
FIG. 6 shows a bottom view of the closure member of FIG. 1.
Figure 3:
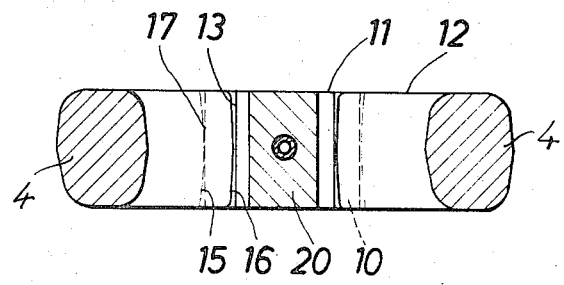
FIG. 3 represents a section taken along the line III - III of FIG. 1.

The connecting link according to the present invention is characterized primarily in that between two portions of the connecting link which are arranged in spaced relationship to each other there is provided an insert opening for inserting chain links which are insertable through the opening, into which opening a closure member can be placed which positively engages corresponding elements in the ends of the said portions, the elements being provided with rounded portions positively engaged by the corresponding rounded sections to the closure member.

According to a preferred embodiment of the invention, for purposes of saving space, the closure member is located within the insert opening. Preferably, the rounded sections which permit the positive engagement between closure member and the ends of the annular link are formed by grooves which preferably extend at a right angle with regard to the central longitudinal plane of the link so that the closure member can easily be inserted from the side.

In order to safely secure the closure member in the connecting link, the recesses or cutouts are preferably undercut in a dovetail manner. In order to obtain as high a strength as possible, the recesses or cutouts are provided approximately in the center of the height of the legs.

For further facilitating the insertion and removal of the closure member, the preferably obtuse angled roof-shaped bottom surfaces of the grooves extend parallel to the end surface of the respective pertaining leg.

When the extensions of the closure member have the same length as the grooves, no dirt or soil can collect in the grooves when the connecting link is closed.

Expediently, the closure member is preferably on both sides and in the vicinity of the extensions provided with engaging surfaces for engagement with the end surfaces of the legs so that with a closure member inserted, relatively smooth outer surfaces of the connecting link are obtained.

A particularly advantageous further development of the invention consists in that the closure member has that part thereof which is located in the insert opening merge with a section for the receiving opening which is preferably narrower and is located in the receiving opening so that the receiving opening, after insertion of the closure member, is subdivided into two individual openings.

Moreover, in this way there is obtained the possibility of having the subdividing portion in engagement with the inner surface of the longitudinal web which is located opposite the insert opening so that the two longitudinal webs are braced against each other.

In order to assure a particularly good moveability of the chain links engaging the connecting link, the subdividing portion comprises concavely rounded surfaces located in the receiving opening.

Advantageously, the outer surfaces of the closure member are in alignment with the adjacent pertaining surfaces of the connecting link while preferably the link web, which is located opposite the insert opening and preferably is double-trapezoidal, laterally protrudes beyond these surfaces so that the closure member and the interengaging and positively engaging elements are well protected.

According to a further development of the invention, the closure member is secured by means of a bolt, especially a spiral clamping pin, which is preferably parallel to the central plane of the connecting link pressed into a bore of the longitudinal web located opposite the insert opening and into a bore of the closure member so that the closure member is detachably secured.

Referring now to the drawing in detail, the connecting link according to the present invention comprises a link body 1 formed primarily by two longitudinal webs 2, 3 and two transverse webs 4 which are located at the ends of the link and interconnect the two longitudinal webs 2, 3. The one longitudinal web 3 is formed by two legs 5 extending toward each other but located in such spaced relationship to each other that they define an insert opening therebetween. It is this insert opening through which chain links to be interconnected can be inserted into the receiving opening 6 defined by the longitudinal webs 3, 2. In condition of operation, the insert opening 6 can be closed by a closure member 7.

Those end faces of the legs 5 which face each other are each provided with a groove 8 of a dovetail-shaped contour, which grooves extend at a right angle to the central plane of the link body 1.

That section 9 of the closure member 7 which is located in the insert opening has two sides thereof which face away from each other provided with dovetail-shaped extensions 10 which fit into the dovetail-shaped grooves 8 in such a way that the closure member 7 can be inserted into the link body from the side. The length of the dovetails 10 corresponds to the length of the grooves 8, in other words, to the thickness of the legs 5 in such a way that the lateral surfaces 11, 12 of the closure member 7 and of the link body 1 are in alignment with each other with the exception of the longitudinal web 2 which is somewhat larger in the direction of the thickness of the link body 1. On both sides of each dovetail 10, the section 9 of the closure member 7 has engaging or abutment surfaces 13, 14 for engagement with the end surfaces of the legs 5. The bottom surface 15 of each groove 8 and the end surface 16 extending parallel thereto and pertaining to the respective leg 5 are formed by two individual surfaces which form an obtuse roof-shaped configuration. The outer longitudinal surfaces 17 and the engaging surfaces 13, 14 are substantially plane so that the closure member 7, in view of the thus obtained funnel shape, can easily be inserted. The closure member 7 and the longitudinal web 3 formed by the legs 5 form a common tire engaging surface 18 of the connecting link. The bottom running surface 19 is located opposite the tire engaging surface 18 and is formed by the longitudinal web 2.

The closure member 7 furthermore comprises a dividing or partition section 20 which is located in the receiving opening 6 and by means of which the receiving opening 6 is subdivided into two individual openings 21. The lateral surfaces of the dividing section 20 which form the corresponding lateral confining surfaces 22 of the individual openings 21 are within the region in which they merge with the section 9 concavely rounded in such a way that the dividing section 20 is narrower than the section 9. The end surface 23 of the dividing section 20 rests against the inner surface 24 of the longitudinal web 2 so that the two webs 2, 3 are braced against each other or mutually support each other by means of the closure member 7.

Located in the longitudinal central plane of the link body 1 is a bore 25 which is located in the longitudinal web 2 at a right angle with regard to the longitudinal extension of the link body 1. This bore 25 has associated therewith a bore 26 of substantially the same diameter, said bore 26 being located in the closure member 7. The two bores 25, 26 are in alignment with each other when the closure member 7 has been inserted and extend from the bottom running surface 19 to the tire engaging surface 18. A spiral clamping pin 27 is pressed into the bores 25, 26 for securing the closure member 7. The pin 27 can without difficulty be pressed out so that subsequently the connecting link 1 can be opened again by removal of the closure body.

The bore 26 in the closure body 7 has the end face 23 of the dividing section 20 a conically widening portion 28 so that when pressing in the pin 27 from the longitudinal web 2, the closure member 7 will automatically be aligned with regard to the bolt.

The longitudinal web 2 has its lateral surfaces laterally protrude beyond the lateral surfaces 12 of the transverse webs 4 and the longitudinal web 3 and thereby beyond the lateral surfaces 11 of the closure member 7 so that the latter is well protected. The merging sections 29 from the tire engaging surface 18 to the transverse webs 4 are rounded with a radius which extends substantially over a quarter of a circle and which is only slightly less than the length of the legs 5 to the bottom surface of the respective pertaining dovetailed groove. The remaining merging areas 30 of the bottom running surface are rounded with a radius which relative thereto is smaller by more than one half.

It is, of course, to be understood that the present invention is, by no means, limited to the particular showing in the drawing but also comprises any modifications within the scope of the appended claims.

What I claim is:

1. A connecting link for chains, which comprises: a link body having first web means with one surface means and also having second web means with second surface means, said link body having a chain link receiving opening partially defined by said first and second web means, one of said first and second web means having a break therethrough extending from one side of said link body to the other side of said link body so as to define passage means leading from the outside of said link body to said receiving opening for inserting chain links therethrough into said receiving opening, and a closure member detachably inserted into said passage means and positively engaging said link body to close said passage means with assurance against widening of the passage means to one side of said receiving opening for respectively receiving two chain links.

2. A connecting link according to claim 1, in which the web means defining said passage means are provided with recess means, and in which said closure member is provided with protrusions shaped in conformity with said recess means for positively engaging the same with assurance against widening.

3. A connecting link according to claim 2, in which said recess means are formed by grooves extending at a substantially right angle to the longitudinal central plane of said link body and facing each other.

4. A connecting link according to claim 2, in which said recess means are undercut.

5. A connecting link according to claim 2, in which said recess means are dovetail-shaped and located in said passage means substantially half way between said longitudinal receiving opening and the outside of said link body.

6. A connecting link according to claim 3, in which the bottom surfaces of said grooves are substantially parallel to those surfaces of the adjacent web means which define that section of said passage means which is located between said grooves and the outside of said link body.

7. A connecting link according to claim 6, in which said bottom surfaces are of an obtuse roof-shaped contour.

8. A connecting link according to claim 3, in which said closure member adjacent to the protrusions thereof is provided with engaging surfaces for engagement with at least a portion of those walls of the adjacent web means which define a portion of said passage means and are located between said protrusions and the outside of said link body.

9. A connecting link according to claim 1, in which that section of the closure member which is located in said passage means is wider than that section of the closure member which is located in said longitudinal receiving opening, said last mentioned section engaging the inner surface of the web means remote from said passage means.

10. A connecting link according to claim 9, in which the outer contour of said wider section merges with the outer contour of said narrower section.

11. A connecting link according to claim 10, in which the merging sections are concave.

12. A connecting link according to claim 1, in which the outer surfaces of the closure member are substantially flush with the respective adjacent surfaces of the link body while the web means adjacent the inner end of said closure member protrude beyond those outer surfaces of said link body which are adjacent said closure member and flush therewith.

13. A connecting link according to claim 12, in which said web means which are adjacent the inner end of said closure member have oppositely located double roof-shaped surfaces one of which forms the ground contacting surface.

14. A connecting link according to claim 1, in which said closure member has an axial bore, and which comprises bolt means pressed into said last mentioned bore through at least one of said web means to secure said closure member in said link body.

15. A connecting link according to claim 14, in which said bolt means is formed by a spiral pin.

16. A connecting link according to claim 1, in which said closure member and mating locations of said link body have rounded-off complementary interfit with each other.

17. A connecting link according to claim 1, in which said closure member in direction of a connecting line between both end part legs of the connecting link has link engaging means projecting oppositely away from each other extending beyond planar location of termination of end part legs and at right angles to central axis of the passage means.

18. A connecting link according to claim 17, in which said closure member between said link engaging means has a projecting section therebetween extending centrally into the opening of the link body surrounded arcuately by more than 180°.

* * * * *